United States Patent [19]
Girard et al.

[11] 3,834,473
[45] Sept. 10, 1974

[54] METHOD TO REGULATE FEEDING OF BULK MATERIAL

[75] Inventors: Marc M. Girard, Ugine; Daniel M. Martin, Metz, both of France

[73] Assignee: Institut de Recherches de la Siderurgie Francaise, Saint-Germain-en-Laye, France

[22] Filed: May 21, 1973

[21] Appl. No.: 362,184

[30] Foreign Application Priority Data
May 25, 1972 France .............................. 72.18591

[52] U.S. Cl. ...................... 177/1, 177/25, 177/116, 177/119, 177/50, 235/151.33
[51] Int. Cl. ........................................... G01g 19/00
[58] Field of Search ...................... 177/1, 3–7, 177/12, 14, 15–18, 25, 50, 64, 114–115, 116, 119, 164; 222/14, 55, 71, 77; 235/151.33

[56] References Cited
UNITED STATES PATENTS

| | | | |
|---|---|---|---|
| 2,897,638 | 8/1959 | Maker | 209/121 X |
| 2,962,150 | 1/1963 | Haley et al. | 222/55 X |
| 3,116,801 | 1/1964 | Bauder et al. | 177/1 |
| 3,186,596 | 6/1965 | Badgett | 222/14 |
| 3,225,180 | 12/1965 | Zorena et al. | 235/151.33 |
| 3,477,529 | 11/1969 | Burn et al. | 177/50 |
| 3,634,187 | 1/1972 | Chari et al. | 235/151.33 X |
| 3,636,994 | 1/1972 | Lilljefors | 177/116 X |
| 3,724,569 | 4/1973 | Blodgett | 177/1 |

*Primary Examiner*—Richard B. Wilkinson
*Assistant Examiner*—Vit W. Miska
*Attorney, Agent, or Firm*—Michael S. Striker

[57] ABSTRACT

A method intermittently supplying bulk material, especially scrap iron, to a point of use so as to supply thereto a charge equal to a predetermined mean constant rate of supply per unit of time of such material, in which successive discrete quantities of such material are withdrawn, for instance by being elevated by an electromagnet, from a storage area, in which the weight of each withdrawn quantity or partial charge is measured, and in which the time of departure of each charge toward the point of use is calculated as a function of the sum of weights of preceding quantities released, the weight of the elevated quantity and the desired charge, and an apparatus for carrying out the aforementioned steps and to calculate the time periods of releasing successively raised quantities of material.

4 Claims, 5 Drawing Figures

METHOD TO REGULATE FEEDING OF BULK MATERIAL

BACKGROUND OF THE INVENTION

The present invention relates to a method of regulating feeding of bulk material to supply apparatus for treating such bulk material in a continuous manner. According to the method distinct quantities of such material are successively elevated at a first location, for instance, a storage area, transported to a second location in the region of use of the material at which successive partial charges thus elevated are released at the end of successive time periods which are calculated as a function of the sum of weights of preceeding charges, the weight of the last charge elevated and the desired charge with which the aforementioned apparatus should be supplied in order to make a continuous treatment of such material possible. The intervals of release of successive partial charges are calculated by a calculator and the release of each successive charge is controlled by control means in accordance with the time periods calculated by the calculator. The method according to the present invention is especially applicable for the charge of scrap iron to apparatus for continuously refining such scrap iorn.

The present invention relates especially to a method of regulating feeding of bulk material, such as scrap iron, which cannot be withdrawn in a continuous stream, for instance from a silo.

It is general practice to supply a treating apparatus with bulk material in a regulated manner. This is for instance the case in certain metallurgical installations which are operated in a continuous manner, such as continuously operated electric furnaces or apparatus for continuous refining of scrap iron by means of oxygen. The possibility to introduce scrap iron into such apparatus constitutes in many cases an important economic factor.

The shape of generally available scrap iron usually makes it impossible to produce therefrom a continuous stream as is obtainable from pulverulent material so that the feeding thereof through a funnel from a silo is impractical.

SUMMARY OF THE INVENTION

It is an object of the present invention to overcome the difficulties inherent with supplying an apparatus with a regulated amount of bulk material, such as scrap iron of all kinds, which cannot be discharged in a continuous stream from a silo.

With these and other objects in view, which will become evident as the description proceeds, the method according to the present invention for intermittently supplying bulk material, especially scrap iron, from a first location to a point of use so as to supply to the latter a charge equal to a predetermined mean constant rate of supply per time unit of such material mainly comprises the steps of withdrawing a discrete quantity of the material at the first location, measuring the weight of the withdrawn quantity and releasing each withdrawn quantity for movement toward the point of use at the end of a time period calculated as a function of the sum of weights of preceding quantities released, the weight of the withdrawn quantity and the desired charge according to the formula $$t_n = \frac{2\sum_{0}^{n-1} P + P_n}{2q}$$

wherein $\sum_{0}^{n-1} P$ is the sum of the weights of preceding $n-1$ quantities released, $P_n$ is the weight of the withdrawn quantity and $q$ is the desired charge per unit of time.

According to a further advantageous feature of the method, the start of the period of time at the end of which a respective quantity of material is released is periodically reset to zero in synchronism with the release of a quantity of material.

The method according to the present invention permits to realize a discontinuous supply of material in such a manner that the actually supplied amount of material during a certain time period deviates only by a very small amount from the desired supply and the mean supply will be equal to the desired mean charge. Preferably, each partial charge is disposed onto a belt conveyor which feeds successive partial charges to the point of use and the time intervals of successive partial charges are calculated in the manner set forth above so that the individual partial charges of different weights will result in a mean supply by the conveyor which will be substantially constant and substantially equal to a desired charge per time unit.

By periodically resetting the start of the time period at the end of which a respective quantity of material is released to zero, it is possible to properly carry out the process for an unlimited time.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
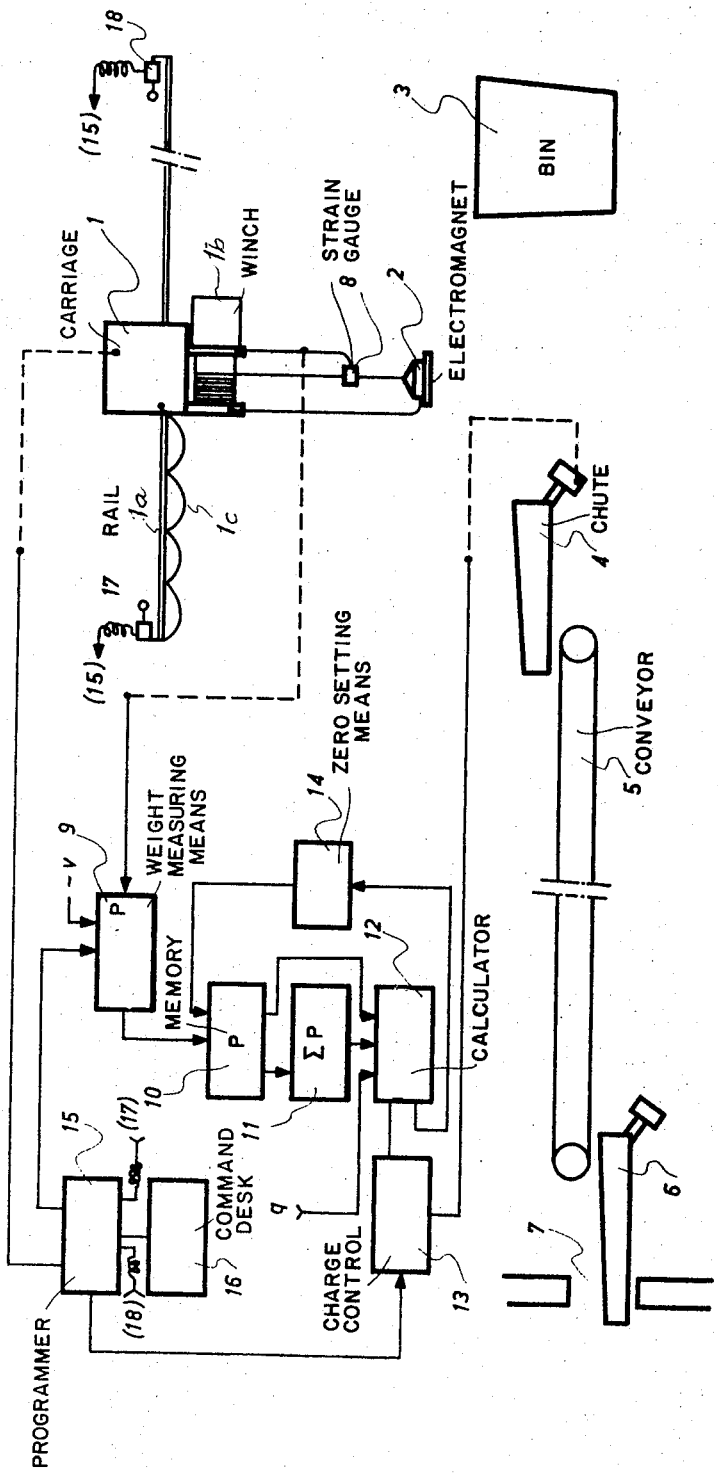
FIG. 1 schematically illustrates an apparatus for carrying out the method according to the present invention in a semiautomatic manner.

Referring now to the drawing, and more specifically to FIG. 1 of the same, it will be seen that the apparatus according to the present invention may comprise a carriage 1 movable along a monorail 1a and carrying at the bottom thereof a winch 1b on which a cable is wound which carries at its lower end thereof an electromagnet 2. The motor, not shown in the drawing, for causing movement of the carriage 1 along the rail 1a is supplied through a cable 1c from a source of electric power supply, not shown in the drawing, and this cable is also connected to the winch 1b for operating the latter and to the electromagnet 2 for energizing and respectively deenergizing the same. The carriage 1 is movable along the rail 1a from a first location in which the electromagnet 2 is located above a storage bin 3 which contains a supply of scrap material so that when the magnet 2 is lowered into contact with the scrap material, energized, and subsequently elevated by the winch 1b, the magnet will pick up a certain quantity of scrap material from the bin 3, which is now elevated by the winch 1b and the carriage 1 is moved along the rail 1a to a second location in which the magnet with a quantity of scrap material will be located above a vibratable chute 4. The left outlet end of the chute 4 is located above an endless belt conveyor 5 which feeds the partial charge, transmitted to the chute 4 from the electromagnet 2 by deenergizing the latter, into a second vibratable chute 6 which, in turn, delivers the material to a point of use, i.e., into the inlet opening 7 of an apparatus to be supplied with such material. Means 8 are provided in the region of the lower end of the cable which supports the electromagnet 2 for furnishing a signal correspondent to the tension applied to the cable. The means 8 may for instance by constituted by a strain gage. The aforementioned described elements are associated with an assembly for regulating operation of these elements and this assembly comprises weight measuring means 9 receiving the signal produced by the strain gage 8 for thus establishing the weight of the partial charge or quantity of material lifted by the electromagnet 2, means 10 connected to the measuring means 9 for temporarily memorizing the weight of the partial charge lifted, means 11 to summarize the weight of successive partial charges and to memorize the value of this sum, calculating means 12, and control means 13 controlling the release of each partial charge. The calculating means 12 receives information from the memorizing means 10 and 11, as well as a signal $q$ representing the value of the desired charge per time unit, and the calculating means calculates an output signal which is applied to the control means 13. The calculating means 12 further produces an output signal which is applied to transfer and zero setting means 14 connected to the memorizing means 10. The control means 13 controls by means of a delay means incorporated therein, for example a clockwork associated with a counter, the moment of release of a partial charge onto the belt conveyor 5. In the arrangement illustrated in FIG. 1, the control means 13 controls the circuit which starts vibration of the vibratable chute 4. The weight measuring means 9 is connected with the memorizing means 10 and receives its information from the strain gage 8, as well as command signals from the programmer 15 which controls operation of the winch 1b in a manner which will be explained later on. The programmer 15 is also connected to the control means 13 as well as to a command desk 16 for the carriage 1 which is under the control of an operator. A constant tension signal V corresponding to the idle weight of the electromagnet 2 is also applied to the input side of the measuring means 9. Two end contacts 17 and 18 are provided at opposite ends of the rail 1a and these end contacts are connected to the programmer 15. The deenergization of the electromagnet 2 is controlled, in the embodiment shown in FIG. 1, by the operator from the command desk 16 when the carriage 1 is over the chute 4.

Figure 2:
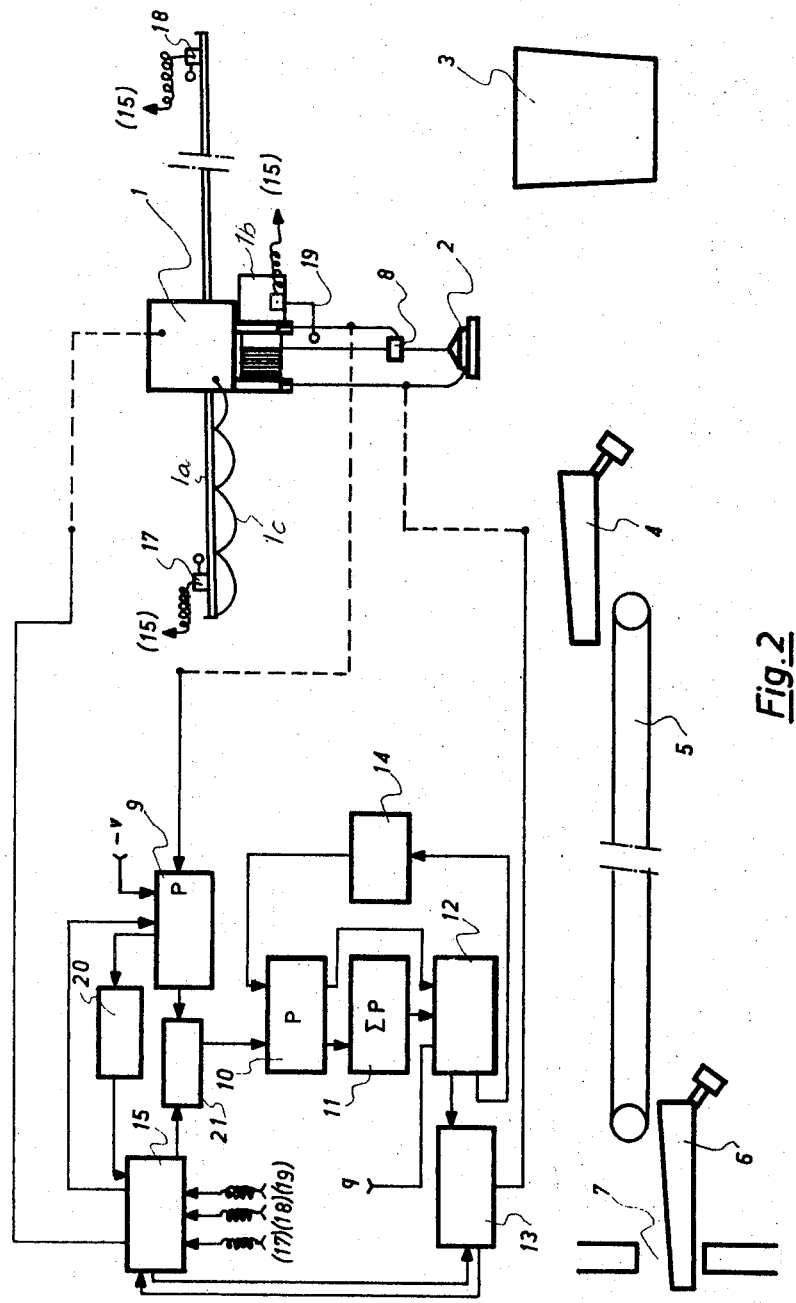
FIG. 2 schematically illustrates an apparatus for carrying out the method according to the present invention in a fully automatic manner.

Referring now to FIG. 2, it will be seen that the arrangement schematically illustrated therein comprises the same elements as the arrangement described in connection with FIG. 1. The command desk for the carriage 1 is, however, replaced by an assembly which will control the operation of the various elements of this arrangement in a fully automatic manner. The horizontal displacement of the carriage on the rail 1a is limited by the end contacts 17 and 18 provided in the region of opposite ends of the rail 1a and these contacts are connected to the motor in the carriage, not shown in the drawing, which produces the horizontal displacement of the carriage, and to the programmer 15. The carriage is further provided with detecting means 19 for arresting the winch 1b when the electromagnet 2 reaches its uppermost position. The programmer 15 controls successive movements of the carriage 1 and the winch 1b as a function of the information received from the contacts 17, 18 and 19. Such programming arrangement is well known in the art and it is therefore not necessary to describe the same in detail.

The downward movement of the electromagnet is regulated when the latter reaches a position above the chute 4 by a time delay relay which fixes the duration of the operation of the winch 1b. The descending movement of the electromagnet 2 is controlled in the position above the bin 3 by test means 20 on information delivered to the latter from the strain gage 8. A gate 21 is interposed between the measuring means 9 and the memory means 10 and this gate is controlled from the programmer 15. The function of this arrangement will be described later on. The control means 13, which control the release of the partial charges, controls in the embodiment shown in FIG. 2 the excitation of the electromagnet.

Figure 3:
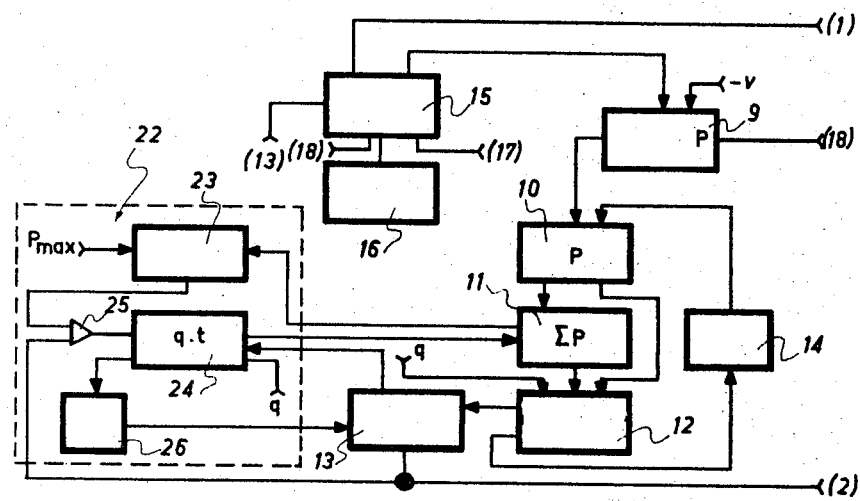
FIG. 3 schematically illustrates a detail of the apparatus shown in FIGS. 1 and 2 for resetting the calculated time periods periodically to zero.

FIG. 3 schematically illustrates a detail of a regulating arrangement which can be used in the arrangements illustrated in FIGS. 1 and 2 and which has also means 22 for periodically resetting the counter of the control means 13 and the weight summarizing means 11 to zero and to reintroduce at the same time an initial value into the weight summarizing and memorizing means 11. The zero setting and reintroducing means 22 comprise a comparator 23 connected to an auxiliary calculator 24 by means of a gate 25 controlled by the control means 13 and a zero setter 26 connected to the counter of the control means 13. The zero setting and introducing means 22 are interposed between the summarizing and memory means 11 and the control means 13 which control the release of the individual partial charges. The operation of this arrangement will be described later on.

Figure 4:
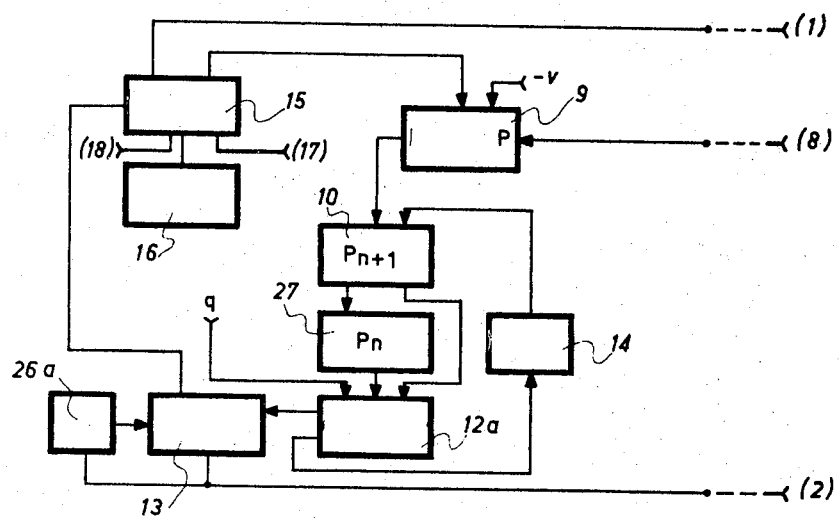
FIG. 4 schematically illustrates a part of a modified apparatus.

A modification of the arrangement shown in FIG. 3 is schematically illustrated in FIG. 4 and the arrangement disclosed therein likewise comprises weight measuring means 9, means 10 for temporarily memorizing the weight, calculating means 12a, control means 13, and transfer and zero setting means 14. The temporary memorizing means 10 are connected according to this modification to an auxiliary memory 27 and the control means 13 is associated with means 26a for resetting the counter of the control means 13 to zero and the means 26a are operated in synchronism with a signal issued by the control means 13 for releasing the individual charge.

Figure 5:
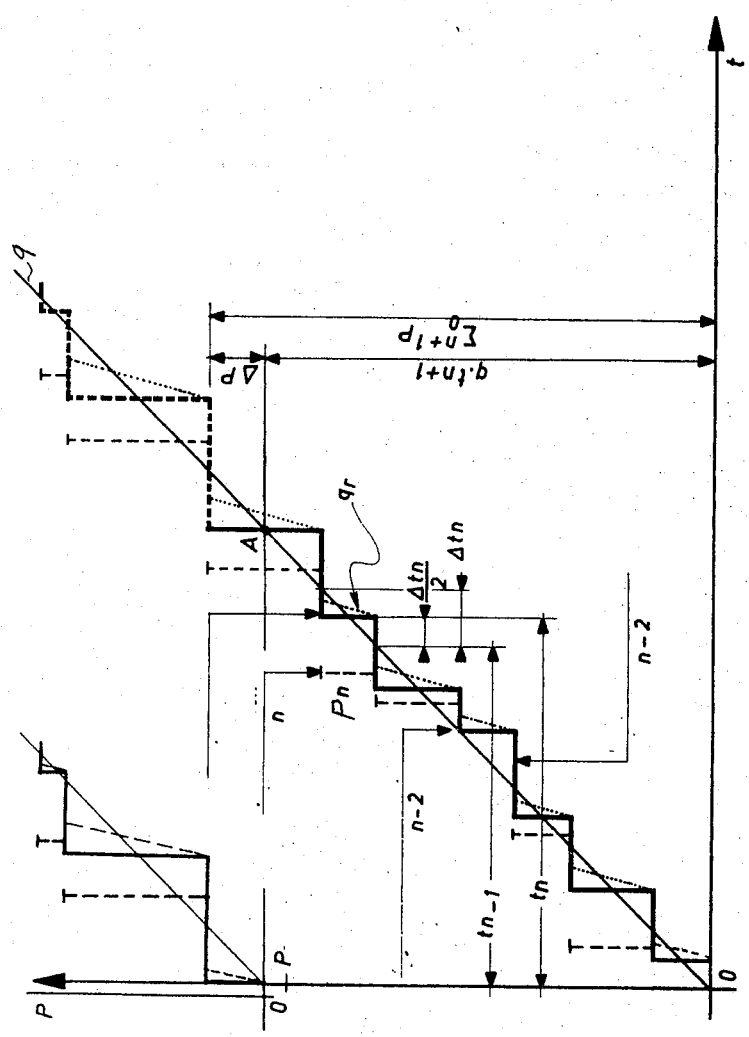
FIG. 5 illustrates a charging diagram, according to the method of the present invention.

FIG. 5 represents a charging diagram illustrating the principle of regulation of individual charges according to the present invention and this diagram is valid for the semiautomatic operation or the fully automatic operation of the apparatus disclosed as well as for the modification illustrated in FIG. 4. In this diagram the time is indicated in the direction of the abscissa and the weight of the individual charges on the ordinate, whereas the desired theoretical charge is indicated by the straight line $q$. The release of any charge $n$ is actuated at the instant $t_n$ which is $$t_n = t_{n-1} + (\Delta t_n/2)$$

in which $t_{n-1}$ is the instant at which the total amount of material discharged is equal to the desired delivery and $\Delta t_n$ is a time interval between the instant $t_{n-1}$ and the instant of actual release of the charge $n$. It is therefore possible to write $$t_n = \frac{\sum_0^{n-1} P}{q} + \frac{P_n}{2q}$$

or to write further:

$$t_n = \frac{2\sum_0^{n-1} P + P_n}{2q}$$

As can be seen from the diagram, the actual total charge will always be in the neighborhood of the desired theoretical total charge regardless of the weights of the individual charges released as long as the instant of release of each individual charge is controlled according to the above formula. In the event in which the release of an individual charge is ordered by the aforementioned described means before this charge is actually properly disposed for release, a safety device initiates the actual release of the charge after it is properly positioned. This eventuality is illustrated in the diagram for the charge $n-2$. The function of this safety device will be explained later on. The initial regulation of the intensity of the excitation of the electromagnet is effected as a function of the value of the desired supply and the minimum frequency of successive charges in such a manner that the mean weight value of the charges is compatible with the value of the desired charge to be supplied. The actual total charge will be closer to the desired charge when the frequency of individual charges is increased. However, the frequency of the successive charges will depend on the nature of the scrap iron which may necessarily require a minimum value of excitation of the electromagnet. The correspondent adjustment of excitation of the electromagnet will therefore be specific for each installation and may vary in conformity with the nature of the scrap iron used. It should be also mentioned that the actual delivery of scrap iron will not correspond exactly to the step-wise curve as shown in full lines in FIG. 5 due to the fact that the distribution of the scrap iron is carried out by a vibrating chute onto the belt conveyor 5 so that the charge is spread during the time of its further transportation from the chute 4 to the inlet opening 7 of the apparatus to be supplied. The actual charge delivered may therefore be schematically represented by the dotted lines $q_r$ shown in FIG. 5 which are connected by much shorter horizontal lines than the theoretical step-wise curve shown in full lines in FIG. 5.

The apparatus as illustrated in FIGS. 1 and 2 will be operated as follows:

The electromagnet 2 will lift from the storage bin 3 a partial charge or a distinct quantity of scrap iron, the weight of which will essentially depend on the characteristics of the electromagnet and the regulation of the excitation thereof. The lifting movement of the partial charge adhering to the electromagnet is controlled by the programmer 15 in such a manner as to comprise a level stretch of predetermined duration. At the end of this level stretch, the programmer 15 releases the signal produced by the strain gage 8, indicating the weight of the lifted partial charge, to the measuring means 9 connected to the strain gage 8. The programming of the lifting movement is carried out in this way in order to eliminate any errors in the indicated weight which would result from the dynamic effect of the upward movement, if the latter would not be momentarily interrupted. A constant tension value V, corresponding to the net weight of the electromagnet without the charge, is applied to the input of the measuring means 9 so that the latter will establish at its output, by subtraction of the value of the constant V, a signal corresponding exclusively to the actual weight of the partial charge elevated by the magnet. The charge is now transported to the point of release above the vibrating chute 4. The value of the weight of the charge clinging to the electromagnet, that is $P_n$, is introduced into the memorizing means 10, preferably after conversion into a digital signal. The calculator 12 calculates $$t_n = \frac{\sum_0^{n-1} P + P_n}{2q}$$

in accordance with the value $P_n$ received from the memorizing means, the value $$\sum_0^{n-1} P$$

received from the summarizing and memorization means 11, and the value $q$ of the desired charge introduced into the calculating means. The value $t_n$ thus calculated, is transferred to the control means 13. The calculator 12 simultaneously produces a signal applied to the input of the transfer and zero setting means 14 and this signal will cause the transfer of the value $P_n$ from the temporary memory 10 to the summarizing and memory means 11 and reset at the same time the value memorized in the memorizing means 10 to zero. The control means 13 causes at the end of the calculated time $t_n$ the departure of the charge toward the conveyor either by starting vibration of the chute 4 to evacuate therefrom the scrap iron deposed thereon in the manner as shown in FIG. 1 or by directly interrupting excitation of the electromagnet in the manner as shown in FIG. 2 in which latter case the chute 4 is constantly vibrated. The scrap iron is thus deposed on the conveyor 5. The end contacts 17 and 18 connected to the programmer 15 will assure retention of the charge elevated by the electromagnet whenever the latter is in a position different from the position above the chute 4 as well as release of the charge from the magnet when the latter is in a position above the chute.

Referring now to the special arrangement illustrated in FIG. 2, it will be noted that the movements of the carriage 1 and the electromagnet 2 will be performed in a completely automatic manner by means of the programmer 15. The indicator 19 of the winch 1b will control by means of the programmer 15 the horizontal movement of the carriage 1. The control means 13, which controls the excitation of the electromagnet 2, is connected to the programmer 15 in such a manner to produce a lifting of the electromagnet after the charge clinging thereon is released at the expiration of the time $t$. The descending movement of the electromagnet above the bin 3 will vary in dependence on the level of the scrap iron in this bin and the descending movement is controlled by the programmer 15, which releases, in dependence of signals received from the contacts 18 and 19, the signal obtained from the weight measuring means 9 which measures the weight of the electromagnet during its descent. Due to the introduction of the constant tension value V, which corresponds to the weight of the magnet 2, the value of the signal delivered by the weight measuring means 9 will, during the descent of the magnet, be in the neighborhood of zero. When the magnet contacts the upper level of the scrap iron, the strain gage 8 will deliver a value zero, and the measuring means 9 will produce an output signal indicating a tension corresponding to the tension value V introduced thereinto. This value is detected by the test means 20 connected to the measuring means 9 and the test means 20 will apply a signal to the programmer 15 which will stop further operation of the winch and further downward movement of the electromagnet. The release of the measured weight of the electromagnet during the downward movement is synchronized with the gate 21 interposed between the weight measuring means 9 and the memorizing means 10 to close this gate during the downward movement of the electromagnet in order not to introduce into the memory means 10 an undesired value. The start of the programmed lifting movement of the charge, initiated with a time delay from the programmer 15, will cause opening of the gate 21.

The mode of operation of the zero setting and reintroduction means 22, illustrated in FIG. 3, is explained as follows. The comparator 23 continuously compares the value established by the summarizing memory 11 with a maximum value $P_{max}$ applied to the comparator 23. The value $P_{max}$ is smaller, by a predetermined value corresponding at least to the maximum value of the weight of a charge which can be lifted by the electromagnet with a predetermined excitation, than the capacity of memorization of the summarizing means 11, that is the maximum value the summarizing means may memorize, in order to avoid an eventual saturation of the memory of the summarizing means 11. After the value summarized by the summarizing means 11 reaches or surpasses the value $P_{max}$ applied to the comparator 23, the latter will produce a signal applied to the gate 25, without however deblocking the aforementioned gate. The auxiliary calculating means 24 calculates in a continuous manner the theoretical weights $q \cdot t$ corresponding to the desired charge $q$ and the instantaneous value of the time $t$ delivered from the counter of the control means 13. The particular value $q \cdot t_i$ corresponding to the value $q \cdot t$ when the charge of the order $i$ is released by the control means 13, is subtracted from the value contained in the summarizing means 11 at the moment of the departure of the aforementioned charge. This result is obtained by causing the transfer of the signal from the comparator 23 into the auxiliary calculating means 24 by opening the gate 25, the output of which is connected to the input of the control means 13. The auxiliary calculating means 24 produces at the same time a signal which sets the counter of the control means 13 to zero.

It is to be understood that the subtraction of the specific value $q \cdot t_n$ at the moment of the release of a charge and the resetting to zero of the counter of the control means 13 will occur only if the following two conditions are met:

The sum of the weights in the summarizing means 11 must be superior to the maximum value $P_{max}$ applied; and the control means 13 must initiate the release of the charge of the order $n$.

This result is obtained by the gate 25 the two inputs of which are respectively connected to the comparator 23 and to the control means 13 and the output of which commands the transfer of the value $q \cdot n$ from the auxiliary calculator means 24 to the summarizing means 11.

It is likewise to be understood that the value $q \cdot t_{n+1}$ corresponding to the theoretical weight at the moment of the release of a charge of the order $n + 1$ will be subtracted from the value of the sum $$\sum_0^{n+1};$$

in fact the command of the transfer of the value $P_{n+1}$ of the weight of the charge of the order $n+1$ from the memorizing means 10 to the summarizing means 11 will always occur before the charge $n+1$ is released. In other words, the arrangement has the task to reset to zero the counter of the control means 13, for instance at an instant $t_{n+1}$ corresponding to the release of one charge and indicated at the point A in the diagram of FIG. 5, and to maintain in the summarizing means 11 a value $\Delta P$ corresponding to the difference of the actual weight $$\sum_0^{n+1} P$$

discharged at the time $t_{n+1}$ and the theoretical weights $q \cdot t_{n+1}$ which values are also indicated in the aforementioned diagram.

In this way, a proper weight value is reinserted in the summarizing means 11 simultaneously with a resetting to zero of the time scale without disturbing the process of regulation.

The following will explain the function of the modification illustrated in FIG. 4 which has been described in the preceding parts of the specification. FIG. 4 illustrates an arrangement in which the time scale is reset to zero after release of each charge. The calculating means 12a calculates therefore a delay signal $\Delta t$ representing the time interval separating the release of two successive charges, for instance charges of the order $n$ and $n+1$, $$\Delta t = \frac{2\sum_0^n P + P_{n+1}}{2q} - \frac{2\sum_0^{n-1} P + P_n}{2q}$$

which can be written also:

$$\Delta t = \frac{2\left(\sum_0^n P - \sum_0^{n-1} P\right) + P_{n+1} - P_n}{2q}$$

or $[2P_n + P_{n+1} - P_n]/2q = [P_n + P_{n+1}]/2q$

The value of the weight of the prepared charge $P_{n+1}$ is introduced into the memorizing means 10. The calculating means 12a calculates:

$\Delta t = [P_n + P_{n+1}]/2q$ from the value $P_{n+1}$ received from the memorizing means 10 and the value $P_n$ received from the auxiliary memory 27 and the value $q$ of the desired discharge introduced into the calculator 12a. The value $\Delta t$, which constitutes a delay signal, is transmitted to the control means 13. The calculator 12a simultaneously produces a signal applied to the transfer and zero setting means 14 which signal will command the transfer of the value $P_{n+1}$ into the memorizing means 10, which thus is in a state to receive the value $P_{n+2}$ of the weight of the following charge. The control means 13 releases after the expiration of the time interval $\Delta t$ the charge of the order $n + 1$ toward the conveyor and produces at the same time a signal to the zero setting means 26a of the counter of the control means 13 to reset the counter to zero.

It is to be understood that the modified control arrangement as illustrated in FIG. 4 may be used in connection with the semiautomatic arrangement described in connection with FIG. 1 or the completely automatic arrangement, as described in connection with FIG. 2.

It is also to be understood that the method of regulating release of successive charges at calculated time intervals is not limited to charges of magnetizable material, since evidently the electromagnet used in the described examples for elevation and release of successive charges may be replaced by any means known in the art for elevation and release of charges of bulky material.

The method according to the present invention is applicable for feeding a regulated amount of material into an apparatus in which the material is such that it cannot be discharged at a constant flow rate from a silo, but otherwise the type of the material is not limited to the type described. An especially advantageous application of the present method is the regulated supply of scrap iron to apparatus for the production of steel by continuously refining the scrap iron. In fact, the method will assure a substantially constant feed compatible with the dynamic of the refining process.

It will be understood that each of the elements described above, or two or more together, may also find a useful application in other types of apparatus for feed bulk material differing from the types described above.

While the invention has been illustrated and described as embodied in an apparatus for feeding bulk material, and especially scrap iron, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended with the meaning and range of equivalence of the following claims.

What is claimed as new and desired to be protected by Letters Patent is set forth in the appended claims:

1. A method of intermittently supplying bulk material, especially scrap iron, from a first location to a point of use so as to supply to the latter a charge equal to a predetermined constant rate of supply per unit of time of such material, said method comprising the steps of withdrawing a discrete quantity of the material at said first location; measuring the weight of the withdrawn quantity; and releasing the withdrawn quantity for movement toward the point of use at the end of a time period $t_n$ calculated as a function of the sum of weights of preceding quantities released, the weight of the withdrawn quantity and the desired charge according to the formula:

$$\frac{2\sum_0^{n-1} P + P_n}{2q}$$

wherein $$\sum_0^{n-1} P$$

is the sum of the weights of preceding $n-1$ quantities released, $P_n$ is the weight of the withdrawn quantity, and $q$ is the desired charge per unit of time.

2. A method as defined in claim 1, wherein the start of the period of time at the end of which the respective quantity of material is released is periodically reset to zero in synchronism with the release of a quantity of material.

3. A method as defined in claim 2, wherein the sum of the weights of the preceding released quantity of material is memorized by a memory, and including the step of setting this memory to a reset value simultaneously with resetting the start of the time period to zero by introducing into the memory a value calculated from the formula:

$$\sum_0^n P - qt_n$$

at the moment of time $t_n$ of the release of the charge of the weight $P_n$.

4. A method as defined in claim 1, wherein the start of the period of time at the end of which the respective quantity of material is released is set to zero in synchronism with the release of each charge.

* * * * *